(12) United States Patent
Hassel et al.

(10) Patent No.: US 11,143,557 B2
(45) Date of Patent: Oct. 12, 2021

(54) METHOD AND APPARATUS FOR READING DETECTOR ARRAYS

(71) Applicant: TEKNOLOGIAN TUTKIMUSKESKUS VTT OY, Espoo (FI)

(72) Inventors: Juha Hassel, Espoo (FI); Hannu Sipola, Espoo (FI); Andrey Timofeev, Espoo (FI); Visa Vesterinen, Espoo (FI)

(73) Assignee: TEKNOLOGIAN TUTKIMUSKESKUS VTT OY, Espoo (FI)

( * ) Notice: Subject to any disclaimer, the term of this patent is extended or adjusted under 35 U.S.C. 154(b) by 299 days.

(21) Appl. No.: 16/468,851

(22) PCT Filed: Dec. 13, 2017

(86) PCT No.: PCT/FI2017/050884
§ 371 (c)(1),
(2) Date: Jun. 12, 2019

(87) PCT Pub. No.: WO2018/109274
PCT Pub. Date: Jun. 21, 2018

(65) Prior Publication Data
US 2020/0096391 A1    Mar. 26, 2020

(30) Foreign Application Priority Data
Dec. 14, 2016 (FI) .................................. 20165965

(51) Int. Cl.
*G01J 5/10* (2006.01)
(52) U.S. Cl.
CPC .......... *G01J 5/10* (2013.01); *G01J 2005/106* (2013.01)

(58) Field of Classification Search
CPC ............................... G01J 5/10; G01J 2005/106
See application file for complete search history.

(56) References Cited

U.S. PATENT DOCUMENTS

| 4,694,466 A | 9/1987 | Kadin |
| 4,982,080 A | 1/1991 | Wilson et al. |

(Continued)

FOREIGN PATENT DOCUMENTS

| CN | 102004219 | 4/2011 |
| CN | 102819518 | 12/2012 |

(Continued)

OTHER PUBLICATIONS

International Search Report for PCT/FI2017/050884, dated Mar. 21, 2018, 3 pages.

(Continued)

*Primary Examiner* — David P Porta
*Assistant Examiner* — Meenakshi S Sahu
(74) *Attorney, Agent, or Firm* — Nixon & Vanderhye PC

(57) ABSTRACT

A solution for reading detector arrays is disclosed. The solution comprises generating (400) an excitation signal, varying (402) the frequency of the excitation signal in time, supplying (404) the excitation signal to a detector array comprising a set of thermal detectors. The number of detectors corresponds to the frequencies of the excitation signal. In the solution, the signal is demodulated (406) at the output of the detector array and time-multiplexed base band signal is obtained. An analogue to digital conversion is performed (408) to the time-multiplexed base band signal and the base band signal is demultiplexed (410) to obtain a set of detector signals.

16 Claims, 5 Drawing Sheets

(56) References Cited

U.S. PATENT DOCUMENTS

| | | | |
|---|---|---|---|
| 5,986,382 A | 11/1999 | Nysen | |
| 7,830,532 B2 | 11/2010 | De Coi | |
| 8,240,911 B1 * | 8/2012 | Pfeifer | G01K 17/00 374/117 |
| 8,547,118 B1 | 10/2013 | Vojjala et al. | |
| 10,145,743 B2 * | 12/2018 | Timofeev | G01J 5/20 |
| 2010/0243865 A1 | 9/2010 | Olcott et al. | |
| 2011/0280279 A1 | 11/2011 | Gregory et al. | |
| 2014/0253094 A1 | 9/2014 | M'Jahed et al. | |
| 2015/0293236 A1 | 10/2015 | Cecil et al. | |

FOREIGN PATENT DOCUMENTS

| | | |
|---|---|---|
| CN | 106017669 | 10/2016 |
| EP | 2963445 | 1/2016 |
| WO | 2007/065591 | 6/2007 |

OTHER PUBLICATIONS

Written Opinion of the ISA for PCT/FI2017/050884, dated Mar. 21, 2018, 7 pages.
Search Report for FI20165965, dated Jun. 9, 2017, 2 pages.
Cmb-S4 Collaboration, "Detectors, multiplexing, readout—survey of current technologies and areas of focus for CMB-S4", XP055456039, Sep. 16, 2016, 40 pages.
McHugh et al., "A readout for large arrays of microwave kinetic inductance detectors", Review of Scientific Instruments, chapter 83, 2012, pp. 044702-1-044702-9.
Office Action dated Jul. 21, 2020 in corresponding Chinese Application No. 201780074141, 12 pages.

* cited by examiner

METHOD AND APPARATUS FOR READING DETECTOR ARRAYS

This application is the U.S. national phase of International Application No. PCT/FI2017/050884 filed 13 Dec. 2017, which designated the U.S. and claims priority to FI Patent Application No. 20165965 filed 14 Dec. 2016, the entire contents of each of which are hereby incorporated by reference.

TECHNICAL FIELD

The exemplary and non-limiting embodiments of the invention relate generally to reading detector arrays. Embodiments of the invention relate especially to solutions for reading thermal detector arrays using radio frequency or microwave signal.

BACKGROUND

Thermal detectors, especially cryogenic and superconducting thermal detectors, are used, for example, in applications where very small radiation signals to are to be detected. Typically these detectors are arranged in detector arrays comprising a set of detectors. In reading detector arrays it is common to use some multiplexing technique. In this context, multiplexing means to techniques enabling reading out a multitude of detector or sensor signals in such a manner that a single set of arrangement or device is used for a number of detectors. Multiplexing techniques are conventionally used in reading of large sensor or detector arrays in order to increase the simplicity, to reduce the cost, and/or to alleviate the need for extensive wiring for large detector arrays. The last aspect is of particular importance in cooled (cryogenic) detector systems, as heat load from the wiring between the sensor and the arrangement configured to read the sensor sets requirements for the cooling power.

Cooled detectors are typically used in applications where very small signals are to be detected. In general, cooling suppresses thermal fluctuation phenomena that add noise in the system to be measured. In addition, cooling is used to provide access to the utilisation of low-temperature specific materials parameters such as low specific heat capacity, and physical phenomena such as superconductivity. In applications requiring high sensitivity, the aim is usually to obtain the sensitivity as limited by the physical properties of the detector itself, i.e. the performance is not to be degraded by the noise incident from the arrangement reading the sensors.

There is a need be able to read out a multitude of detector signals with one reading and wiring arrangement without significantly degrading the signal-to-noise ratio as compared to the reading of a single detector.

BRIEF DESCRIPTION

According to an aspect of the present invention, there are provided a method for reading detector arrays, comprising: generating an excitation signal; varying the frequency of the excitation signal in time; supplying the excitation signal to a detector array comprising a set of thermal detectors, wherein the number of detectors corresponds to the frequencies of the excitation signal; demodulating the signal at the output of the detector array and obtaining time-multiplexed base band signal; performing analogue to digital conversion to the time-multiplexed base band signal; and demultiplexing the base band signal to obtain a set of detector signals.

According to an aspect of the present invention, there are provided an arrangement for reading detector arrays, comprising a signal generator configured to generate an excitation signal, vary the frequency of the excitation signal in time and supply the excitation signal to a detector arrays comprising a set of thermal detectors, wherein the number of detectors corresponds to the frequencies of the excitation signal; a demodulator configured to demodulate the signal at the output of the detector array and obtain a time-multiplexed base band signal; a converter configured to perform analogue to digital conversion to the time-multiplexed base band signal; and a demultiplexer configured to demultiplex the base band signal to obtain a set of detector signals.

The some embodiments of the invention are disclosed in the dependent claims.

BRIEF DESCRIPTION OF THE DRAWINGS

In the following the invention will be described in greater detail by means of preferred embodiments with reference to the attached [accompanying] drawings, in which.

DETAILED DESCRIPTION OF SOME EMBODIMENTS

A thermal detector may generally be defined as a sensor configured to convert a signal, typically electromagnetic radiation, into a temperature difference, which is dependent on the signal. The information of the signal is then obtained by measuring temperature by a thermometer element configured to convert the temperature into an electrical signal.

Cryogenic thermal detectors include superconducting transition edge sensors (TESs) in which a superconducting structure is biased near a superconducting transition where the strong temperature dependence of the normal state resistance is used to detect the signal to be measured. The signal, typically a sub-millimeter wave or X-ray signal, is converted into a temperature variation by absorbing the signal in the detector element.

Another category of cryogenic detectors is kinetic inductance detectors (KIDs). KIDs have been proposed in particular for the detection of submillimetre-wave radiation for astronomical applications. In kinetic inductance detectors, the signal is converted into a variation of a kinetic inductance of a superconducting inductor. The change of the kinetic inductance can be accounted for by the incoming radiation with a frequency larger than the double superconducting gap, thus making possible to break superconducting charge carriers, Cooper pairs, into quasiparticle excitations (single electrons). As the quasiparticles have a finite lifetime at very low temperatures (typically<1 K), the kinetic inductance, dependent on Cooper pair density, varies as a function of the signal. On the other hand, KIDs can be also operated in a thermal mode. In that approach, the incoming radiation signal is absorbed on a thin-film membrane further hosting a kinetic inductance thermometer detecting the temperature change of the membrane. Potential applications of this approach are particularly in security screening applications revealing concealed objects e.g. from under the clothes.

Figure 1:
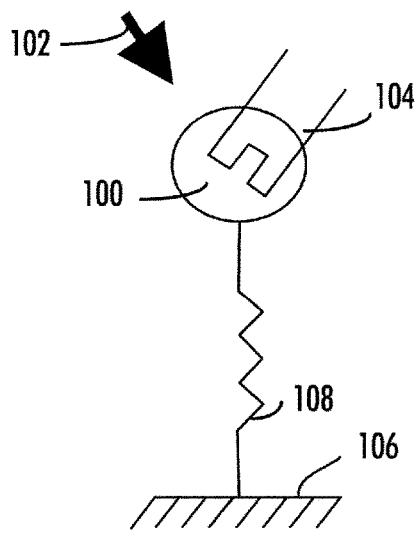
FIG. 1 illustrates a conceptual illustration of a thermal detector.

FIG. 1 conceptually illustrates a thermal detector. The detector comprises a thermally confined volume or thermal mass 100. The thermal mass of the detector receives radiation 102 having power P. The thermal mass has a heat capacity c and power-dependent temperature T(P). Thus, the temperature of the thermal mass is a function of the radiation power. The temperature of the thermal mass may be measured by a thermometer 104. In an embodiment, the thermometer is superconducting kinetic inductor. The thermally confined volume or thermal mass 100 is connected to a thermal bath 106 via a thermal link 108 having thermal conductance G. The thermal bat may be a substrate formed by a silicon wafer, for example. As there are thermal detectors of many types, the above illustration is merely an illustrative example.

Kinetic inductance detectors (KIDs) by design suitable for reading utilising radio frequency (RF) or microwave (MW) frequencies. Transition edge sensors (TES) can be also operated by biasing the sensor by RF signals, which property can also be used to perform reading at RF frequencies for arrays of TES:s connected to appropriate filter circuits.

Figure 2A:
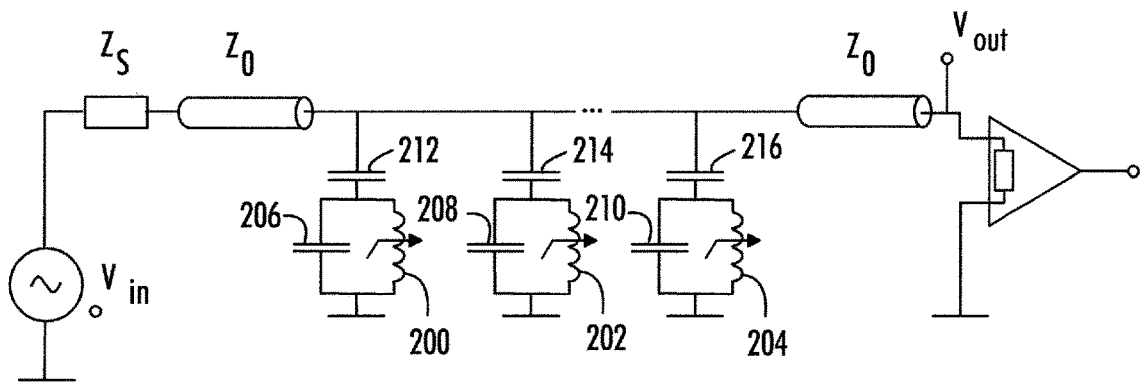
FIG. 2A illustrates an example of a radio frequency or microwave band model of an array of thermal kinetic inductance detector.

An example of an RF/MW band model of an array of thermal KIDs is illustrated in FIG. 2A. The model comprises the kinetic inductance thermometers $L_i(T)$ 200, 202, 204. The circuit contains tuning capacitors $C_i(T)$ 206, 208, 210 define a resonance frequency close or equal to the characteristic frequency $f_i$ used in the reading of the i:th detector. The coupling capacitors $C_{ci}(T)$ 212, 214,216 match the impedance into the readout system with characteristic impedance $Z_0$.

Figure 2B:
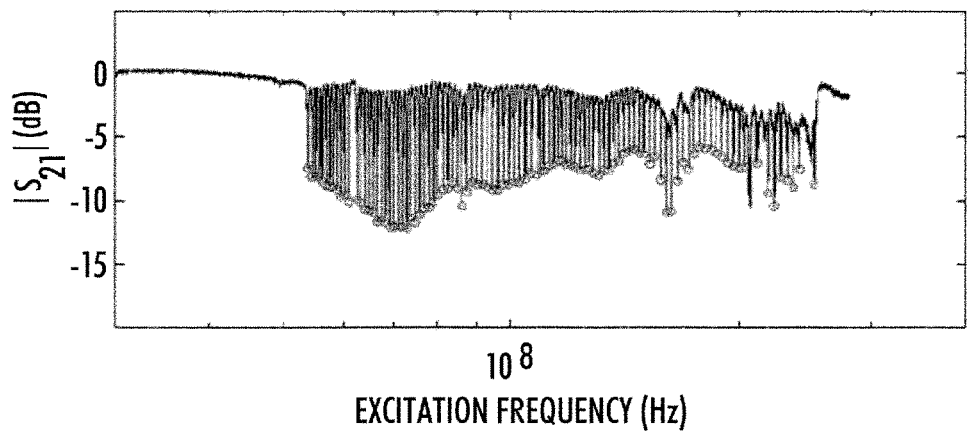
FIG. 2B illustrates the readout band transmission data of a thermal kinetic inductance detector array.

FIG. 2B illustrates the readout band transmission data of the thermal KID array of FIG. 2A, where each spike represents a resonance frequency of an individual detector. As the inductance and hence the resonance frequency is a function of temperature, the absorbed incoming radiation signal modulates the resonance frequency. Therefore, when each of the resonators is excited with a carrier frequency $f_i$, the carrier is modulated by the incoming radiation signal.

Figure 3:
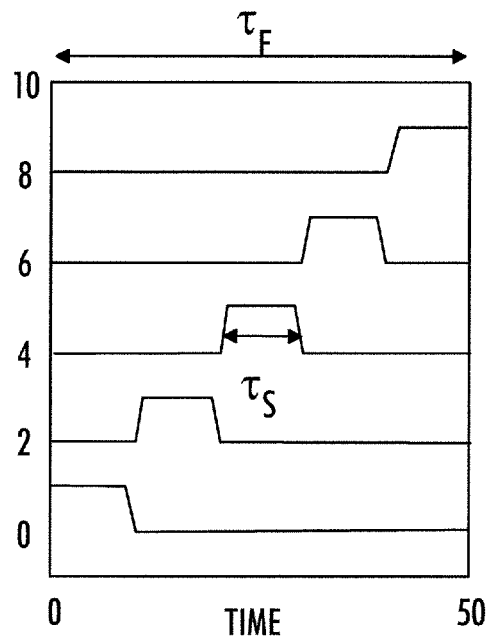
FIG. 3 illustrates an example of time-domain multiplexing.

In general, different multiplexing methods used in reading thermal detector arrays can be classified based on the 'multiplexing basis'. One such basis is time-domain multiplexing (TDM), in which the multiplexed signal contains N sensor signals multiplied by basis functions as shown in FIG. 3 for the example case of N=5. In practical systems, the multiplication by basis function is usually realised by a suitable arrangement of physical switches. In essence, within a total time (time frame $\tau_F$) allocated for reading out all the detectors, each detector is read out during a slot time $\tau_S$, which, ideally, for N detectors or sensors is $\tau_S=\tau_F/N$. The draw-back of the arrangement is that if the sensor has a mechanism adding wide-band-width noise on top of the signal, the signal-to-noise ratio in a multiplexed system degrades in comparison to continuous integrating reading of a single detector with formally $\tau_S=\tau_F$. Also, if wide-bandwidth noise mechanisms from the readout system such as the readout amplifiers are present, their noise contribution increases equivalently.

Physical switches are not needed in frequency-domain multiplexing (FDM). In FDM each detector is excited with a particular frequency (a carrier tone), and the corresponding carrier tone is modulated by the detector signal. The carrier modulation can be either amplitude of phase modulation, or a combination of both. The individual baseband detector signals are obtained by frequency down-conversion at individual local oscillator reference frequencies, typically by digital signal to processing followed by low-pass filtering of the outcoming signals of the each of the down-converted element.

Kinetic inductance detectors (KIDs) and transition edge sensors (TESs) are compatible with the FDM method. FDM is widely used, usually in the context of astronomical imaging. On a practical level, the basic functionality of standard FDM requires, as a minimum, the generation of a frequency comb to address all the detectors within one readout channel simultaneously. Also, and in particular, the signal processing needs for performing the frequency down-conversion (demodulation) sets extensive criteria for the signal processing as a parallel demodulation of high-frequency carrier is needed simultaneously for the signals of all the detectors within an array/readout channel. This readout approach is generally used in astronomical imaging systems, but as it leads to an increased cost and complexity of the readout architectures of imaging arrays with thousands of detectors, it is not a favourable feature for commercial submillimetre-wave imaging systems. Furthermore, one challenge in basic FDM is that due to full parallelisation all the carrier signals are present simultaneously when in the frequency down conversion circuit (demodulation circuit), or in a preamplifier stage. This increases the need of the dynamical range of the readout and signal processing circuitry which needs to handle simultaneously all the signals corresponding to all the detectors within a readout channel.

Figure 4:
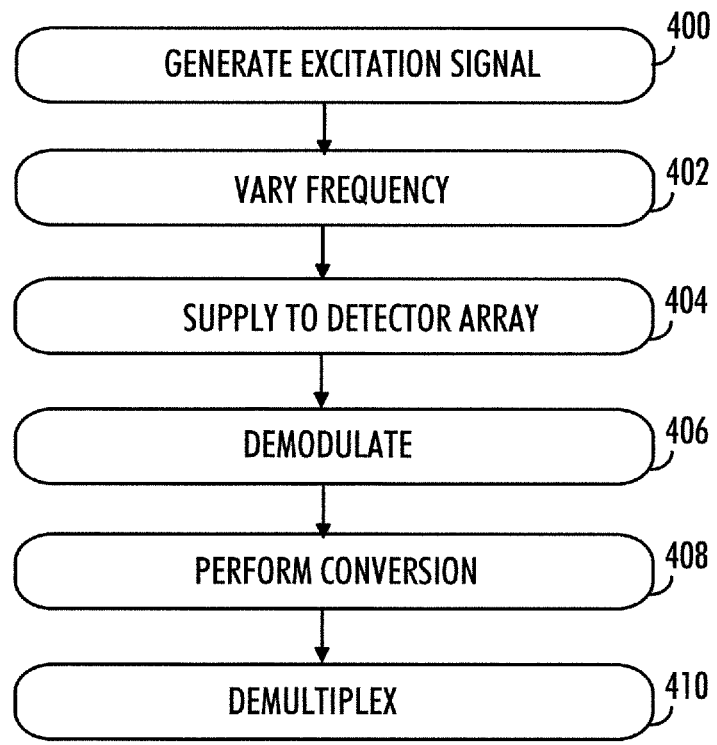
FIG. 4 is a flowchart illustrating an embodiment.

FIG. 4 is a flowchart illustrating an embodiment for reading detector arrays. The proposed solution simplifies the signal processing needs in comparison to FDM especially for large detector arrays (10-10000 detectors per a single readout channel). In particular, the proposed solution removes the need of the frequency comb generation. Furthermore, it removes the need for parallel demodulation in the process of extracting the individual signals from the modulated carrier tone. Also, as it is based on handling a single carrier tone at a time, it relaxes the dynamic range requirements of the readout circuit.

In step 400, an excitation signal is generated.

In step 402, the frequency of the excitation signal is varied in time. In an embodiment, the frequency of the excitation signal is switched through a given set of frequencies during a given time frame $\tau_F$. In an embodiment, the frequency of the excitation signal is kept at each frequency of the given set of frequencies for the duration of a given slot time $\tau_S$.

In step 404, the excitation signal is supplied to a detector array comprising a set of thermal detectors. Typically, the number of detectors corresponds to the frequencies of the excitation signal. In an embodiment, the frame rate $1/\tau_F$ of the frequency of the excitation signal is higher than the thermal cut-off frequency of the thermal detectors in the detector array.

In step 406, the signal at the output of the detector array is demodulated. A time-multiplexed base band signal is obtained at the output of the demodulator.

In step 408, an analogue to digital conversion is performed to the time-multiplexed base band signal.

In step 410, the base band signal is demultiplexed to obtain a set of detector signals.

Figure 5:
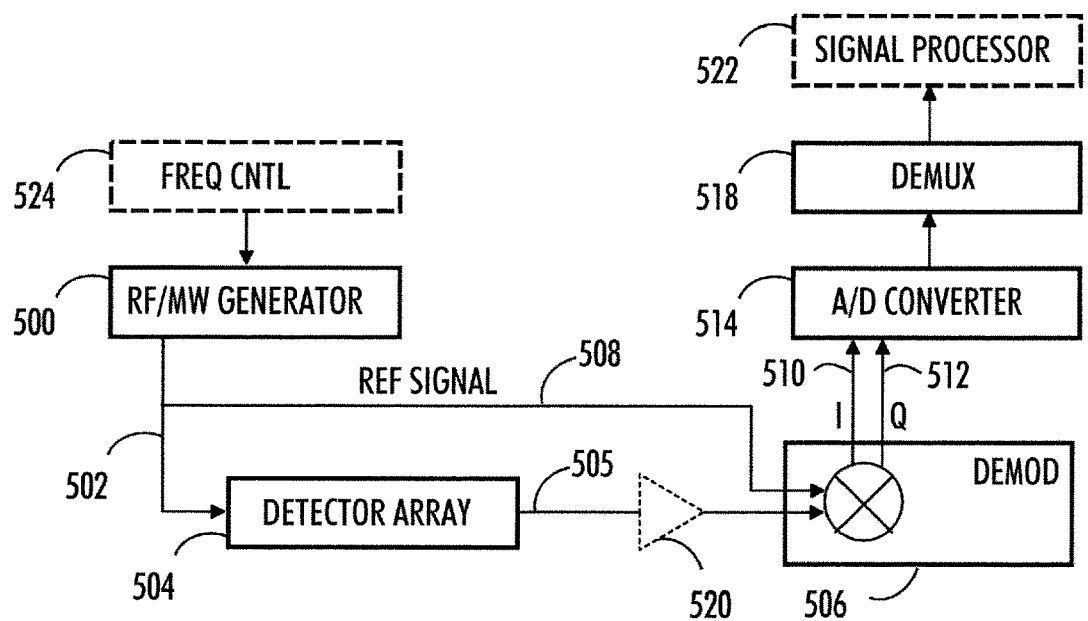
FIG. 5 illustrates a block diagram of an arrangement of an embodiment.

FIG. 5 illustrates a block diagram of an arrangement of an embodiment. The arrangement comprises a RF/MW generator 500 connected 502 to a detector array 504, the generator configured to generate a signal having a frequency which is switching in time in order to excite each of the thermal detectors in the detector array 504. In an embodiment, the frequency $f_i$ of the signal generated by the generator is switched between the characteristic frequencies of each i detectors of the detector array.

The generator 500 may be realised, for example, by a voltage control oscillator (VCO) generating an RF frequency dependent on a control voltage. In this case the frequency control 540 may be a device able to generate an analog control voltage to control frequency switching.

The generator 500 may be also realised by a direct digital synthesizer (DDS) circuit generating signals of arbitrary frequencies from a single fixed-frequency reference clock. The frequency control 540 may in this case be implemented by an appropriate digital circuit providing digital inputs to DDS to set the parameters of the time-switching frequency tones and optionally the amplitude of the carrier signal.

In an embodiment, the generator 500 may be also realised by a field-programmable gate-array (FPGA).

The output 505 of the detector array is operationally connected to a frequency demodulation circuit 506 configured to perform the operation of obtaining the time-multiplexed baseband signal from the modulated signal at the output of the detector array. The signal 508 from the generator may be fed as another input to the demodulator 506, or alternatively generated by another generator. The output 510, 512 of the demodulator 506 is connected to an analogue-to-digital conversion circuit 514 configured to convert the signal into a digital form. In an embodiment, the digital signal may be fed to a demultiplexing circuit 518 or algorithm extracting individual detector signals from the time-multiplexed data.

In an embodiment, the arrangement may also contain a RF preamplification circuit 520 configured to amplify the output signal from the detector array. The arrangement may further comprise an RF frequency control circuit 524 configured to control the frequency of the generator 400 and a signal processing system 522 configured to process the individual detector signals.

Figure 6A:
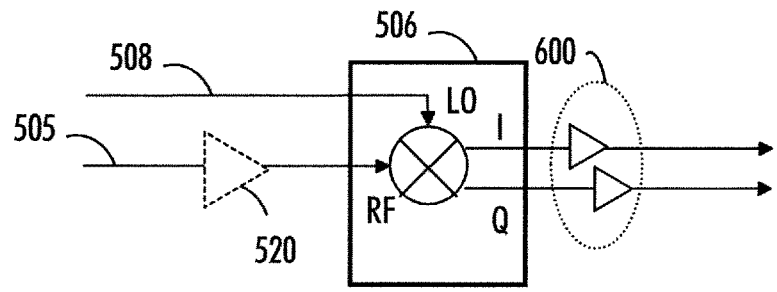
FIGS. 6A to 6E illustrate example of demodulator.

There are various ways to realise the demodulator 506 and possible pre-amplification circuit 520. FIG. 6A illustrates a simplified block diagram for a realisation in which the demodulator 506 is realised by an analogue IQ mixer. The modulated signal 505 from the detectors is fed to the 'RF' port of the mixer, while the reference frequency signal 508 is fed to the local oscillator ('LO') port of the mixer. The intermediate frequency IF outputs marked by I and Q now correspond to the amplitudes of the two orthogonal phase components of the modulated carrier signal. In addition, the readout circuit may contain various amplifiers 600 in the signal chain to amplify the IF signals. The circuits may also include electrical filters not shown in the figure to pick relevant frequency components. The amplifier configuration of FIG. 6A is merely an example.

Figure 6B:
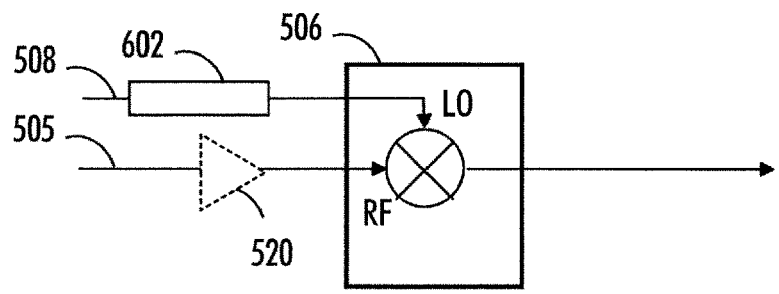

In the case where the detector signal is essentially contained in a single phase component of the modulated carrier signal it is possible to use a single-component mixer. The advantage is that one A/D channel per one readout channel is needed instead of two in comparison to the realisation of FIG. 6A. However, cable delays can induce a significant frequency-dependent phase shift to the modulated signal. FIG. 6B illustrates an example where this can be compensated for by a delay line 602 configured to introduce a similar phase shift to the reference signal 508 generating ideally frequency-independent reference phase with respect to the modulated signal.

Figure 6C:
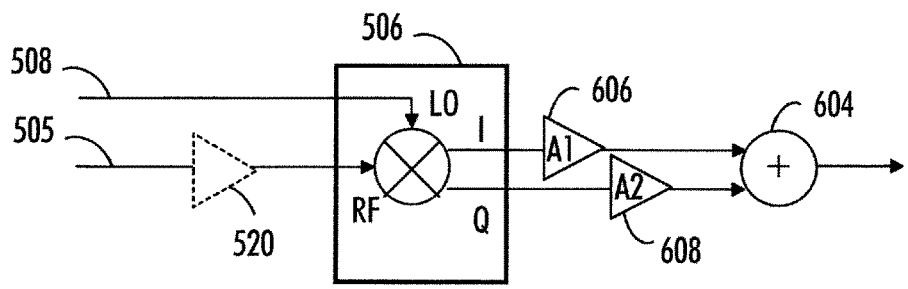

An alternative solution for obtaining a single phase component is schematically presented in FIG. 6C, where the I and Q signal outputs of the mixer are summed 604 by a linear superposition. By making the coefficients of superposition 606 A1 and 608 A2 programmable, and switchable in time along with the switching of the carrier frequency, a relevant phase component can be extracted from the signal corresponding to each of the detectors. The physical realisation of the super-position can be achieved by summing the voltages corresponding to I and Q outputs divided by programmable potentiometers, and summing corresponding voltages.

Figure 6D:
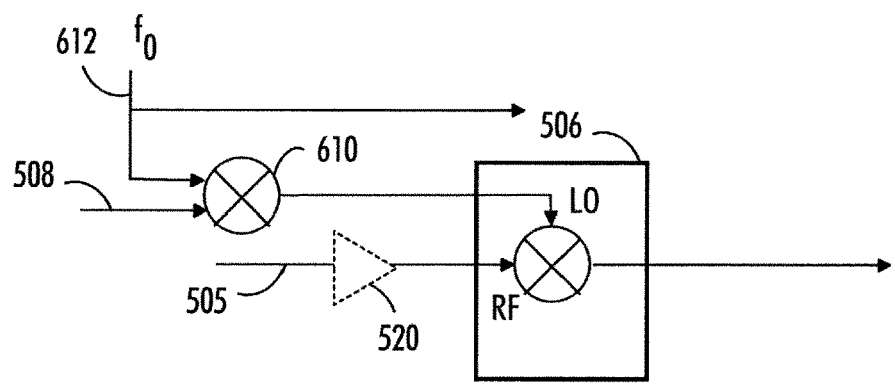

In above solutions the signal fed into the A/D converters represents a to time-multiplexed baseband signal. In some cases, the low-frequency noise of the demodulation circuit may become a problem. In this case it may be preferable to digitise (with A/D converters) the information centered at frequency $f_0$ instead of the baseband (information centered at zero frequency). An example realisation for this is shown in FIG. 6D. In this case the modification is represented by an additional mixer stage 610 fed with additional reference frequency $f_0$ 612. The main component of the signal entering the A/D converters is now centered around $f_i-(f_i-f_0)=f_0$. The final conversion to baseband may now be done by digital signal processing. In an embodiment, it may be preferable to choose $f_0$ to be significantly lower than $f_i$ to avoid high-speed signal processing needs.

Figure 6E:
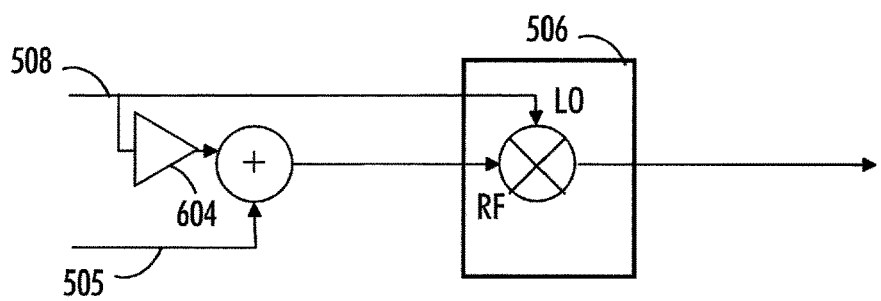

FIG. 6E illustrates shows a further possible arrangement, where the aim is to, completely or partially, compensate for the offset carrier tone to relieve the dynamics requirements in preamplification, demodulation, and/or A/D conversion. The idea is to superpose the modulated RF tone and the reference signal in opposite phases, ideally, to make the modulated signal zero in a situation where the detector signal is zero. This requires that both the amplitude and the phase are properly matched at the summing point.

Figure 7:
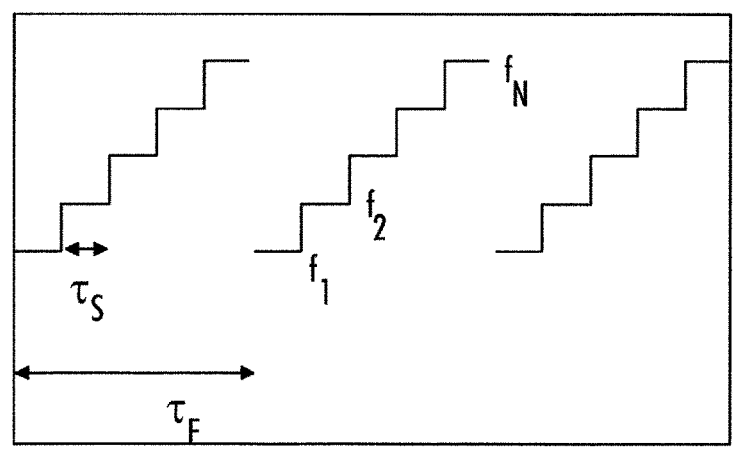
FIG. 7 illustrates an example of the output signal of the generator.

It may be noted that the analogies of the above mentioned circuits based on analogue mixers can also be realised by digital signal processing, for example with a suitable multiplication algorithm. FIG. 7 illustrates an example of the output signal of the generator 500.

Time is on the x-axis and frequency on the y-axis. The frequency of the signal is switched or varied in time, instead of driving all frequencies simultaneously as in FDM. The characteristic frequency of the i:th detector within a channel is transmitted through the detector array (e.g. such as that illustrated in FIG. 2A) for the duration of the slot time $\tau_S$. The consequence of this is that, within this time slot, the phase and/or amplitude of the output carrier signal is/are modulated by the signal received by the i:th detector. The signal is fed into the demodulation circuit 506, optionally, amplified by the RF preamplifier 520. The local oscillator reference frequency of the demodulation circuit 506 preferably represents a copy of the initial carrier tone 508 with frequency $f_i$. Thus the output signal of the demodulation circuit 506 is proportional to the baseband signal of the i:th detector during the corresponding time slot. All detectors will be read during the given time frame $\tau_F$. In the following frame the detectors may be read again.

As the frequency is switched between the characteristic frequencies $f_i$ of each detector within a single channel, the output signal of the demodulation circuit 506 contains essentially time-domain multiplexed information of the detectors. In an embodiment, the full signal information on the demodulation has two degrees of freedom that can be identified as in-phase (I) 510 and quadrature (Q) 512 components of the modulated carrier tone, representing information content equal to the amplitude and the phase of the modulated carrier tone. I and Q components of the carrier tone are then further digitized by the analogue-to-digital converter 514. Alternatively, only one phase component of interest can be digitized: a well-defined single phase component can be obtained through the embodiments of the demodulation circuit presented in FIGS. 6B and 6C. The benefit here is that the requirement for A/D channels is a factor of 2 smaller. After digitizing, the data may be demultiplexed to represent the signal data corresponding to individual detectors. If needed, high-level signal processing such as image formation can be performed by relevant algorithms. It may be also be noted that even in a multiplexed case there may be limitations in how many detectors can be embedded into a detector array corresponding to a single readout channel such as that shown in FIG. 5. In this case the readout system can be scaled up by reading out a number of readout channels in parallel, where each channel consists of a sub-array of the thermal detectors.

The operation principle described above contains the property of noise penalty in case of wide-band noise in analogy to time-domain multiplexed method described above. In principle, in the RF/MW modulated case the electrical filtering may be used to prevent the noise penalty. However, for RF/MW systems, the filter realisation in many cases may represent a very demanding engineering task. Especially, the realisation of passive electrical filtering elements typically leads to unfeasible materials parameters, in particular to the requirement of very low RF/MW losses in conductor materials. Therefore, in an embodiment, the noise penalty may be prevented by thermal integration of the signal by the detector itself, which is functionally equivalent to low-pass filtering the signal and the noise.

Certain criteria for the characteristics of the detector and the readout electronics may be taken into account. The basic criterion is that the dominant noise mechanism is such that it is subjected to the intrinsic thermal integration mechanism of the detector itself. Referring to FIG. 1, one such mechanism is the phonon noise or thermal fluctuation noise related to a random exchange of energy between the thermal mass 100 of the detector and the thermal bath (substrate) 106 via the thermal link 108 characterised by thermal conductance G. To implement thermal filtering, the thermal parameters, heat capacity c of the thermal mass to 100 and thermal conductance G, may be engineered so that the detector thermal time constant $\tau_{th}=c/G$ is sufficiently longer than the frame time $\tau_F$, i.e. that the frame rate $f_F=1/\tau_F$ is sufficiently higher than the thermal cut-off frequency $f_{th}=G/(2\pi c)$ of the detector.

Figure 8A:
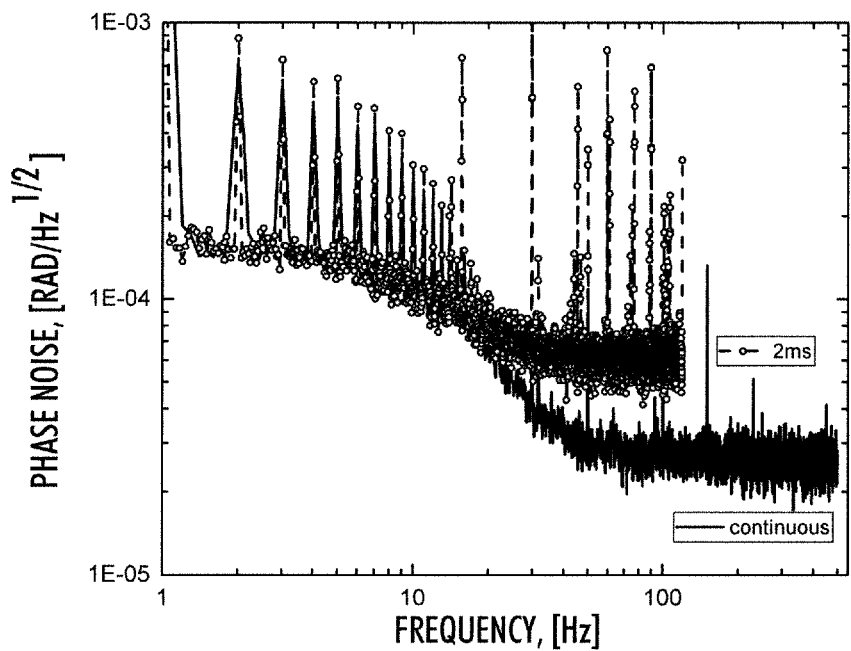
FIGS. 8A and 8B illustrate examples of demultiplexed data from one detector in an array of thermal kinetic inductance detectors.
Figure 8B:
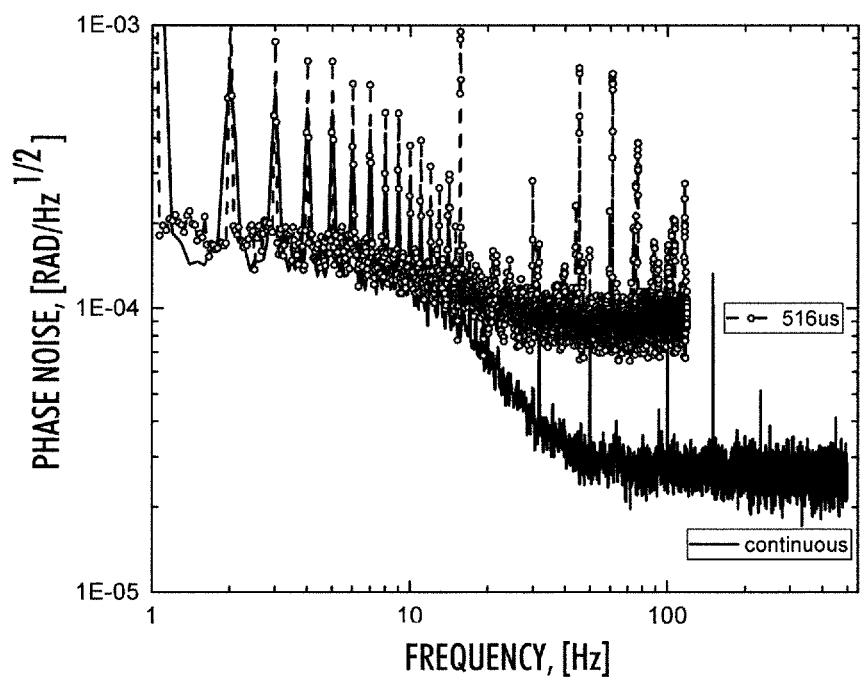

FIGS. 8A and 8B illustrate examples of demultiplexed data from one detector in an array of thermal kinetic inductance detectors measured using the arrangement of FIG. 5. The frame time here is $\tau_F=32$ ms, i.e. $f_F=1/\tau_F\sim 31$ Hz. The thermal cut-off frequency of the detector is in this case $f_{th}\sim 10$ Hz, i.e. the criterion $f_F>f_{th}$ is valid. Furthermore, it is assumed that the noise in the signal band of interest is due to the phonon noise. Therefore the criteria needed for not adding the noise due to the demultiplexing readout within the thermal bandwidth of the detector are valid. Indeed, in the signal band of interest at $f<f_{th}\sim 10$ Hz, FIGS. 8A and 8B show that the noise level does not depend on the slot time (or the multiplexed detector count $\tau_F/\tau_S$), i.e. the noise penalty is avoided.

FIG. 8A illustrates noise spectral density, expressed as the phase noise [rad/√Hz] of a modulated carrier signal in a readout experiment with an array of thermal kinetic inductance detectors, as a function of baseband signal frequency where slot time $\tau_S$ is 2 ms. FIG. 8B illustrates an example where slot time $\tau_S$ is 516 μs. In both figures, the readout frame time here is set to 32 ms, i.e. a readout of one detector is marked with continuous black curve. FIG. 8A further shows readout of 16 detectors in dashed-circle curve and FIG. 8B readout of 64 detectors in dashed-circle curve. The discrete spikes at multiples of 1 Hz emerge in this example due to a thermal interference arising from 1 Hz duty cycle of a cryocooler.

It may be noted that the said noise penalty is avoided only for the detector noise mechanisms that experience the thermal filtering. Other noise mechanisms such as Johnson noise due to electrical dissipation within the thermometer, or the noise of the reading arrangement are not thermally filtered. This also shows in FIGS. 8A and 8B at frequencies larger than the thermal cut-off frequency, where the noise level is increased in accordance with the decrease of the readout slot time (curves for $\tau_S=2$ ms and $\tau_S=0.516$ ms as compared to the electronics noise floor (black curve, continuous readout). The noise level elevation out of the signal band of interest does not degrade the detector performance as long as the noise in the signal band of is not compromised.

It may be noted that in a typical case the responsivity of the detector read with the RF or MW arrangement depends on the amplitude of the carrier excitation signal. In some cases the maximum carrier amplitude, and thus the responsivity, may be limited by the self-heating of the detector due to the carrier signal. In these cases the multiplexing scheme presented above can be further modified by operating with a larger carrier amplitude in the multiplexed case as compared to single detector readout. This allows for increasing the signal strength at the detector output, which further helps overcome certain noise mechanisms, such as the electronics noise, that do not scale with the responsivity.

It will be obvious to a person skilled in the art that, as the technology advances, the inventive concept can be implemented in various ways. The invention and its embodiments are not limited to the examples described above but may vary within the scope of the claims.

The invention claimed is:

1. A method of for reading detector arrays, comprising
   generating an excitation signal;
   varying the frequency of the excitation signal in time;
   supplying the excitation signal to a detector array comprising a set of thermal detectors, wherein the number of detectors corresponds to the frequencies of the excitation signal;
   demodulating the signal at the output of the detector array and obtaining time-multiplexed base band signal;
   performing analogue to digital conversion to the time-multiplexed base band signal; and
   demultiplexing the base band signal to obtain a set of detector signals.

2. The method as claimed in claim 1, wherein the frequency of the excitation signal is switched through a given set of frequencies during a given time frame $\tau_F$.

3. The method as claimed in claim 1, wherein the frequency of the excitation signal is kept at each frequency of the given set of frequencies for the duration of a given slot time $\tau_S$.

4. The method as claimed in claim 2, wherein the frame rate $1/\tau_F$ of the frequency of the excitation signal is higher than the thermal cut-off frequency of the thermal detectors in the detector array.

5. The method as claimed in claim 1, further comprising: amplifying the signal at the output of the detector array prior demodulation.

6. An arrangement for reading detector arrays, comprising
a signal generator configured to generate an excitation signal, vary the frequency of the excitation signal in time and supply the excitation signal to a detector arrays comprising a set of thermal detectors, wherein the number of detectors corresponds to the frequencies of the excitation signal;
a demodulator configured to demodulate the signal at the output of the detector array and obtain a time-multiplexed base band signal;
a converter configured to perform analogue to digital conversion to the time-multiplexed base band signal; and
a demultiplexer configured to demultiplex the base band signal to obtain a set of detector signals.

7. The arrangement as claimed in claim 6, wherein the signal generator configured to switch the excitation signal through a given set of frequencies during a given time frame $\tau_F$ and keep the frequency of the excitation signal at each frequency of the given set of frequencies for the duration of a given slot time $\tau_s$.

8. The arrangement as claimed in claim 7, wherein the frame rate $1/\tau_F$ of the frequency of the excitation signal is higher than the thermal cut-off frequency of the thermal detectors in the detector array.

9. The arrangement as claimed in claim 6, further comprising: an amplifier configured to amplify the signal at the output of the detector array prior demodulation.

10. The arrangement as claimed in claim 6, further comprising: a controller configured to control frequency of the signal generator.

11. The arrangement as claimed in claim 6, wherein the demodulator comprises a mixer and the excitation signal is fed as an input to a local oscillator input port of the mixer and the signal at the output of the detector array is fed to the radio frequency port of the mixer.

12. The arrangement according to claim 11 where the mixer is a two-component (IQ) mixer.

13. The arrangement according to claim 11 where the mixer is a single component mixer.

14. The arrangement according to claim 13, further comprising a delay line in front of the local oscillator input port of the mixer.

15. The arrangement according to claim 12, further comprising a programmable summing circuit connected to the baseband I and Q outputs of the two-component mixer.

16. The arrangement as claimed in claim 11, wherein the mixer is replaced by a digital circuit performing a multiplication function.

* * * * *